United States Patent [19]
Podlas

[11] 3,816,151
[45] June 11, 1974

[54] SELF-DESTRUCTING GELS
[75] Inventor: Thomas J. Podlas, Newark, Del.
[73] Assignee: Hercules Incorporated, Wilmington, Del.
[22] Filed: Aug. 3, 1972
[21] Appl. No.: 277,729

[52] U.S. Cl............. 106/194, 106/198, 260/29.6 H
[51] Int. Cl.. C08b 27/72, C08f 45/46, C08b 21/30, C08b 27/52
[58] Field of Search...260/29.6 M, 29.6 MW, 29.6 H; 252/8.55 R, 8.5 C; 106/194, 198

[56] References Cited
UNITED STATES PATENTS

| | | | |
|---|---|---|---|
| 2,775,557 | 12/1956 | Morgan | 260/29.6 H |
| 3,493,561 | 1/1970 | Kolaian | 252/8.5 C |
| 3,615,794 | 10/1971 | Nimerick | 252/8.55 R |
| 3,727,688 | 4/1973 | Clampitt | 252/8.55 R |

*Primary Examiner*—Theodore Morris
*Attorney, Agent, or Firm*—William S. Alexander

[57] ABSTRACT

Self-destructing polymer gels are prepared by adding to an aqueous solution of an anionic polymer a trivalent chromium compound and an oxidizer selected from either the water-soluble permanganates or persulfates. The polymer can be either an acrylamide—acrylic acid copolymer or CMC. Gelling takes place rapidly followed by decomposition of the gels over a period of several hours to several days.

5 Claims, No Drawings

SELF-DESTRUCTING GELS

This invention relates to the preparation of viscous solutions and gels of cross-linked anionic, water-soluble polymers. More specifically, it relates to the preparation of such gels or solutions which have a self-destruct capability whereby the gel is broken or the viscosity is substantially reduced after a desired time without any further treatments thereof.

The use of polymer thickened fluids and gels is widespread, particularly in the oil industry where such fluids are used in many oil well flooding, plugging or fracturing operations. In many cases, after the thickened polymer has served its intended purpose it is desirable to remove it from the well or from the formation being treated. To this end, it is necessary to be able to decrease the viscosity of the fluid to a more pumpable state. To date, no completely satisfactory technique has been devised for accomplishing this objective. In most cases, the answer has been simply to wait, depending upon the elevated temperature of the environment within the well to degrade the polymer. In other cases, depending upon the polymer employed, degradation can be effected by means of enzymatic action. This technique is unsatisfactory, however, as it is unpredictable and uncontrollable.

In accordance with this invention, a method has been found whereby a reliable self-destructing, thickened fluid can be prepared using certain water-soluble anionic polymers. Specifically, it is found that an aqueous solution of carboxymethylcellulose or of an anionic copolymer based on acrylamide, when treated in a manner to be described hereinafter can have its viscosity increased to a desired degree and thereafter degraded by as much as 95 percent and more. In proceeding according to this invention, an aqueous solution of the anionic polymer is intimately mixed with about 2 to 30 percent by weight, based on polymer weight, of a water-soluble trivalent chromium salt and about 1 to 20 percent by weight, based on polymer weight, of an oxidizer selected from the class consisting of permanganates and persulfates.

In carrying out the process of the invention, the trivalent chromium salt and the oxidizer are intimately mixed with a solution of the water-soluble polymer. The first effect noted is an increase in the viscosity of the solution. This increase is believed to be due to cross-linking of the polymer by the trivalent chromium. Depending upon the degree of anionic functionality of the polymer and the concentration of trivalent chromium relative thereto, the viscosity can increase up to the point where the solution turns into a rigid, intractable gel. The application in which the product is to be used will dictate the nature of the solution required, i.e., soft gel, firm gel or thick solution.

The polymers to which the process is preferably applied are copolymers of acrylamide and an anionic vinyl unsaturated comonomer. The preferred comonomer is sodium acrylate or sodium methacrylate. The comonomer can comprise about 1 to 50 percent by weight of the total copolymer, preferably about 1 to 10 percent by weight. The other type of applicable polymer is carboxymethylcellulose (i.e., the sodium potassium or $NH_4^+$ salt) having a degree of substitution (moles of carboxymethyl substituent per mole of anhydroglucose) of about 0.4 to 1.6, or other water-soluble carboxyl-containing cellulosics such as carboxymethyl hydroxyethyl and carboxymethyl hydroxypropyl cellulose.

A preferred water-soluble trivalent chromium salt is chrome alum, chromium potassium sulfate $[KCr(SO_4)_2]$. Substantially any water-soluble chromium salt can be used, however, including chromium acetate, chromium chloride and chromium sulfate. The concentration of the chromium salt will vary, depending upon the type of solution desired - i.e., thick solution, soft gel, firm gel, etc., and the amount of anionic functionality present in the polymer. In general, it can be said that a greater concentration of chromium ion becomes necessary as the anionic functionality in the polymer decreases. Within the above guidelines, the amount of chromium compound can be about 2 to 30 percent based on the weight of the polymer.

Any water-soluble permanganate or persulfate can be used as the oxidizer. Preferred are the alkali metal or ammonium compounds such as sodium permanganate, sodium persulfate, ammonium persulfate, potassium permanganate or potassium persulfate. The potassium compounds are especially preferred.

The concentration of the oxidizer will be between about 1 and 20 percent, preferably between about 1 and 15%, based on the weight of the copolymer. In connection with oxidizer concentration, a surprising result has been observed in some cases with the acrylamide copolymers. At the lowest levels of oxidizer, viscosity breakdown of the solutions is quite rapid. As the oxidizer concentration increases, the rate of viscosity loss decreases, reaching a minimum and thereafter increasing again. These particular data were observed for a copolymer having relatively low anionic functionality cross-linked with 25 to 50 percent by weight of the chrome alum. Copolymers of higher anionic functionality employ oxidizer concentrations within the same range.

The time required for destruction of a gel can vary, at room temperature, over a period from several hours to several days and as much as a week. As suggested above, the time actually required depends on the polymer which is being treated, the oxidizer concentration, the cross-linker concentration and the polymer concentration. As one would anticipate, the gel destruction takes place more rapidly in the presence of heat. The same factors, however, appear to be operative and similar trends are observed.

In preparing the self-destructing solutions and gels, it is preferable to mix the oxidizer with the polymer solution as a first step and then add the chromium salt to this mixture. Mixing of the ingredients is best accomplished by mixing aqueous solutions of the various ingredients. The mixing can be accomplished, however, by adding solid ingredients to the solution of the copolymer provided that the dissolution rate of the cross-linker and oxidizer and the gelling rate of the copolymer are such that intimate mixing can be completed before gelling begins.

In an alternative method, the oxidizer and the chromium salt solutions can be mixed and added to the copolymer in a single addition. In such a case, however, the mixture must be added to the copolymer solution almost immediately or there will be a reaction between the trivalent chromium and the oxidizer which reduces the efficiency of the gelling and breaking reaction. This method is also unsatisfactory with copolymers of higher anionic functionality as the cross-linking reaction begins so quickly upon addition of the solutions that heterogeneous gel lumps sometimes form before intimate mixing is accomplished.

The invention is illustrated in the following examples, wherein parts and percentages are by weight unless otherwise indicated.

EXAMPLE 1

A 0.5 percent water solution of a 98.5/1.5 mole ratio acrylamide—sodium acrylate copolymer was prepared and divided into a number of aliquots. These were mixed with various amounts of 1.5% $KMnO_4$ solution to yield $KMnO_4$ concentrations, based on polymer, as shown in the table below. When the $KMnO_4$ was thoroughly blended, sufficient 2.8 percent chrome alum solution to yield 28 percent chrome alum concentration, based on polymer was added. The solutions gelled rapidly and were allowed to sit undisturbed until the gels broke, as indicated by their becoming pourable without any lumps. A duplicate series was prepared and placed in an oven at 80°C. and observed periodically for gel breaking.

Pertinent data are recorded in the table below.

| | % $KMnO_4$ | Break Time at Room Temp. | Break Time at 80°C. |
|---|---|---|---|
| 1-1 | 4.4 | 1¼ - 2 hours | No gel |
| 1-2 | 9.0 | 6 - 9 hours | 1 - 1½ hours |
| 1-3 | 13.9 | 8 days | 1½ - 3½ hours |
| 1-4 | 16.0 | 4 days | — |
| 1-5 | 18.4 | 2¼ - 3 days | 1½ - 3½ hours |
| 1-6 | 24 | Overnight | 1¾ - 2½ hours |
| 1-7 | 32 | Overnight | 1 - 1¾ hours |
| 1-8 | 0 | Stable for several months | At least 11 days |

EXAMPLE 2

Substantially the same procedure as in Example 1 was repeated using a 1 percent solution of the polymer and 14 percent, based on polymer, of chrome alum. Similar results were achieved.

| | % $KMnO_4$ | Break Time at Room Temp. | Break Time at 80°C. |
|---|---|---|---|
| 2-1 | 2.2 | 3 - 4 hours | ½ - ¾ hours |
| 2-2 | 4.4 | 7 - 8½ hours | 1 - 1½ hours |
| 2-3 | 7.0 | | 3½ - 4½ hours |
| 2-4 | 9.2 | 2¼ - 3 days | 3½ - 4½ hours |
| 2-5 | 11.9 | 1½ - 2 days | 1½ - 2½ hours |
| 2-6 | 24.0 | Overnight | 1½ - 2½ hours |
| 2-7 | 32.0 | Overnight | 1½ - 2½ hours |
| 2-8 | 0 | Stable for several months | At least 11 days |

EXAMPLE 3

The procedure described in Example 1 was repeated with a 0.5 percent solution of a 90/10 acrylamide—sodium acrylate copolymer containing 5.7 percent chrome alum. The resulting gels were treated in a 90°C. oven.

| | % $KMnO_4$ | Break Time |
|---|---|---|
| 3-1 | 1.6 | 1 - 2 days |
| 3-2 | 2.0 | 6½ - 7½ hours |
| 3-3 | 2.4 | 2 - 6 hours |
| 3-4 | 2.8 | 1 - 2 hours |
| 3-5 | 3.2 | <1 hour |

In addition, on these specimens the time for 95 percent viscosity degradation was determined. Viscosity was measured with a Brookfield Viscometer at 30 RPM. The time indicated is the time when the viscosity reading was only 5 % of the original.

| | % $KMnO_4$ | Time |
|---|---|---|
| 3-6 | 1.6 | 3 days |
| 3-7 | 2.0 | — |
| 3-8 | 2.4 | Overnight |
| 3-9 | 2.8 | 6 - 8 hours |
| 3-10 | 3.2 | 1 - 2 hours |

EXAMPLE 4

In this example, a 0.5 percent solution of the 90/10 acrylamide—sodium acrylate copolymer was treated

| | % $K_2S_2O_8$ | % Cr Alum | Time Gel Destruction | | Time Viscosity Degradation |
|---|---|---|---|---|---|
| 4-1 | 6.8 | 2.85 | Max. visc. | 650 cps. | 6 days |
| 4-2 | 13.5 | 2.85 | do. | 550 cps. | 1 - 2 days |
| 4-3 | 27 | 2.85 | do. | 500 cps. | Overnight |
| 4-4 | 3.4 | 5.7 | 6 days | | 1 - 3 weeks |
| 4-5 | 6.8 | 5.7 | 4 days | | 6 days |
| 4-6 | 13.5 | 5.7 | Overnight | | 1 - 2 days | with a 1.4 percent potassium persulfate solution and 2.8 percent chrome alum solution as explained above. The specimens were aged at room temperature. The times for gel destruction and viscosity degradation were noted.

EXAMPLE 5

Experiments similar to those of Example 4 were carried out, aging the solutions in an oven at 80°C. rather than room temperature.

| | % $K_2S_2O_8$ | % Cr Alum | Time Gel Destruction | Time Viscosity Degradation |
|---|---|---|---|---|
| 5-1 | 2.7 | 15.1 | 2 - 3 hours | 3 hours |
| 5-2 | 2.7 | 9.5 | 1 - 2 hours | 2 - 3 hours |
| 5-3 | 2.7 | 5.7 | 1 - 2 hours | 2 hours |

EXAMPLE 6

A 1 percent solution of carboxymethylcellulose having a D.S. of about 0.7 was combined with 1.6 percent solution of $KMnO_4$ at two levels to prepare mixtures having 7.9 and 11.8% $KMnO_4$, respectively, based on CMC. To each of these was added sufficient 2.8 percent chrome alum solution to add 14.2 percent chrome alum, based on CMC, to the mixture. These gels broke in about 10 days and 4 days, respectively.

What I claim and desire to protect by Letters Patent is:

1. A method of preparing self-destructing gels and solutions based on crosslinked anionic water-soluble polymers which comprises intimately mixing with an aqueous solution of a polymer selected from the class consisting of copolymers of acrylamide and anionic vinyl unsaturated comonomer and carboxymethylcellulose, about 2 to 30 percent by weight of a water-soluble trivalent chromium salt and 1 to 20 percent by weight of an oxidizer selected from the class consisting of permanganates or persulfates.

2. A method according to claim 1 wherein the polymer is a copolymer of acrylamide and sodium acrylate.

3. A method according to claim 1 wherein the polymer is carboxymethylcellulose.

4. A method according to claim 2 wherein the oxidizer is potassium permanganate or potassium persulfate.

5. A method according to claim 4 wherein the trivalent chromium salt is chrome alum.

* * * * *